(12) United States Patent
Guo et al.

(10) Patent No.: US 8,666,245 B2
(45) Date of Patent: Mar. 4, 2014

(54) SYSTEM AND METHOD FOR MEASURING OPTICAL SIGNAL-TO-NOISE RATIO

(75) Inventors: Wei-Hua Guo, Dublin (IE); Edward Flood, Carrickboy (IE); John F. Donegan, Staffan (IE)

(73) Assignee: Provost Fellows and Scholars of the College of the Holy and Undivided Trinity of Queen Elizabeth, Near Dublin, Dublin (IE)

( * ) Notice: Subject to any disclaimer, the term of this patent is extended or adjusted under 35 U.S.C. 154(b) by 0 days.

(21) Appl. No.: 13/500,796

(22) PCT Filed: Oct. 11, 2010

(86) PCT No.: PCT/EP2010/006181
§ 371 (c)(1),
(2), (4) Date: Aug. 10, 2012

(87) PCT Pub. No.: WO2011/042202
PCT Pub. Date: Apr. 14, 2011

(65) Prior Publication Data
US 2012/0293804 A1   Nov. 22, 2012

(30) Foreign Application Priority Data
Oct. 9, 2009   (EP) .................................... 09172682

(51) Int. Cl.
*H04B 17/00*   (2006.01)

(52) U.S. Cl.
USPC ................................. 398/26; 398/25; 398/33

(58) Field of Classification Search
USPC ........................................................ 398/26
See application file for complete search history.

(56) References Cited

U.S. PATENT DOCUMENTS

| | | | |
|---|---|---|---|
| 6,344,910 B1 * | 2/2002 | Cao | 398/34 |
| 6,396,051 B1 * | 5/2002 | Li et al. | 250/227.18 |
| 6,904,237 B2 * | 6/2005 | Rasztovits-Wiech et al. | 398/27 |

(Continued)

OTHER PUBLICATIONS

International Search Report and Written Opinion for PCT/EP2010/006181 (9 pgs), mailed Feb. 28, 2011.

(Continued)

*Primary Examiner* — Ken Vanderpuye
*Assistant Examiner* — Amritbir Sandhu
(74) *Attorney, Agent, or Firm* — K&L Gates LLP (57) ABSTRACT

The invention provides a system and method for measuring optical signal-to-noise-ratio (OSNR) in an optical communication system. A channel filter is adapted to select one specific optical communication channel from a wavelength-division-multiplexing (WDM) optical communication system, wherein the channel comprises an optical signal carrying digital bit information and noise from associated optical power amplifiers in the system. At least one optical delay interferometer is adapted to measure at least two interferograms of the noisy signal. The invention provides a mechanism for calculating the in-band OSNR from extinctions of the interferograms measured at different optical delays by referring to each other, wherein said optical delays are selected to be substantially less than a bit period of the optical channel. Because of the selection of the optical delays and/or the self-reference between the two measurements, the system can follow any changes happening to the signal such as additional filtering, self (cross)-phase modulation, the bias and drive signal change of the modulator used to generate the optical signal.

15 Claims, 6 Drawing Sheets

(56) References Cited

U.S. PATENT DOCUMENTS

| | | | |
|---|---|---|---|
| 6,907,197 B2* | 6/2005 | Heath et al. | 398/26 |
| 7,149,407 B1 | 12/2006 | Doerr et al. | |
| 7,149,428 B2 | 12/2006 | Chung et al. | |
| 7,440,170 B2* | 10/2008 | Kao et al. | 359/337.2 |
| 7,499,173 B1* | 3/2009 | Brodsky et al. | 356/450 |
| 7,986,885 B2* | 7/2011 | Mamyshev | 398/188 |
| 8,073,325 B2* | 12/2011 | Goto | 398/26 |
| 8,358,930 B2* | 1/2013 | Gariepy et al. | 398/26 |
| 2003/0090755 A1 | 5/2003 | Chung et al. | |
| 2004/0156632 A1 | 8/2004 | Lee et al. | |
| 2005/0201751 A1* | 9/2005 | Yao | 398/26 |
| 2005/0232627 A1* | 10/2005 | Sun et al. | 398/26 |
| 2007/0047954 A1* | 3/2007 | Mamyshev | 398/33 |
| 2007/0297043 A1 | 12/2007 | Kao et al. | |
| 2009/0196602 A1* | 8/2009 | Saunders et al. | 398/26 |
| 2009/0279886 A1* | 11/2009 | Suvakovic | 398/26 |
| 2010/0067903 A1* | 3/2010 | Brodsky et al. | 398/26 |
| 2010/0067904 A1* | 3/2010 | Brodsky et al. | 398/26 |
| 2010/0178052 A1* | 7/2010 | Eggleton et al. | 398/26 |
| 2010/0322621 A1* | 12/2010 | Jenkins et al. | 398/26 |
| 2010/0322622 A1* | 12/2010 | Shukunami et al. | 398/26 |
| 2011/0311222 A1* | 12/2011 | Nakamura et al. | 398/26 |

OTHER PUBLICATIONS

Applicant remarks filed on Aug. 9, 2011 with Chapter II demand in PCT/EP2010/006181 (3 pgs).

International Preliminary Report on Patentability for PCT/EP2010/006181 (6 pgs), mailed on Sep. 13, 2011.

Cheung et al., "PMD-Insensitive OSNR Monitoring Based on Polarization-Nulling With Off-Center Narrow-Band Filtering," IEEE Photonics Technology Letters, 16(11):2562-2564, Nov. 2004.

Feuer et al., "Measurement of OSNR in the Presence of Partially Polarized ASE," IEEE Photonics Technology Letters, 17(2):Feb. 2005.

Lee et al., "A Review of the Polarization-Nulling Technique for Monitoring Optical-Signal-to-Noise Ratio in Dynamic WDM Networks," Journal of Lightwave Technology, 24(11):4162-4171, Nov. 2006.

Oh et al., "Interferometric optical signal-to-noise ratio measurements of telecom signals with degraded extinction ratio," Optics Letters, 33(18):2065-2067, Sep. 15, 2008.

Tao et al., "Monitoring of OSNR by Using a Mach-Zehnder Interferometer," Microwave and Optical echnology Letters, 30(1):63-65, Jul. 5, 2001.

* cited by examiner

SYSTEM AND METHOD FOR MEASURING OPTICAL SIGNAL-TO-NOISE RATIO

CROSS REFERENCE TO RELATED APPLICATIONS

This application is a national phase application under 35 U.S.C. §371 of International Application No. PCT/EP2010/006181, filed on Oct. 11, 2010, which claims priority to and the benefit of European Patent Application No. 09172682.8 filed on Oct. 9, 2009, the entire disclosures of each of which are incorporated by reference herein.

FIELD OF THE INVENTION

The present invention relates to a system and method for measuring Optical Signal-to-Noise-Ratio. In particular the invention relates to a system and method for measuring the in-band optical-signal-to-noise-ratio (OSNR) of a single optical communication channel in a wavelength-division-multiplexing (WDM) system.

BACKGROUND TO THE INVENTION

In the present generation of optical communication systems optical amplifiers are employed to boost the optical signal power directly so as to enable the signal propagate long distances without the need for expensive Optical-Electric-Optical conversions. Optical amplifiers also generate amplified spontaneous emission (ASE) noise which limits the bit-error-rate as the signal is changed from optical to electrical at the end-receiver. So the noise level monitoring is essential since the optical signal has to pass through many optical amplifiers before reaching the end-receiver.

Figure 1:
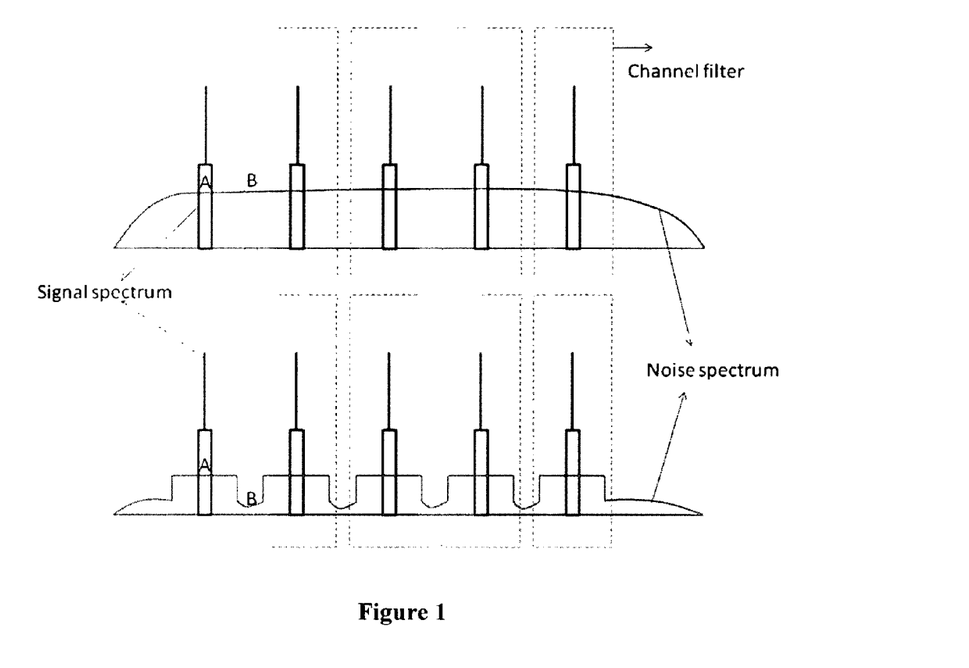
FIG. 1 illustrates a multi-channel spectrum in a wavelength division multiplexing (WDM) system with flat and non-flat noise spectrum.

The optical-signal-to-noise-ratio (OSNR) is a good indicator of the noise level in one optical communication channel in the optical layer. Researchers around the world have spent quite a lot of effort to develop schemes to carry out OSNR monitoring. The generally used OSNR monitoring scheme is an interpolation technique which assumes that the ASE noise is spectrally identical inside and outside the channel band so through interpolation, the noise level inside the channel band can be derived from the noise level outside the band. As seen from the upper part of FIG. 1, the noise level at A inside the channel band can be interpolated from B outside the band. This interpolation technique won't work if the channels are densely spaced such as in the dense-wavelength-division-multiplexing (DWDM) systems where the signals are very close to each other so the noise level beside the band cannot be accurately determined. Also in the future, reconfigurable optical network channels will pass through add-drop multi/demultiplexers which could strongly suppress the noise level beside the band so it cannot be used to interpolate the in-band noise level anymore. As seen from the lower part of FIG. 1, the noise level at B outside the channel band could now be significantly lower than at A inside the band so an interpolation scheme cannot be used to determine the in-band noise level.

Many methods have been reported on the in-band OSNR monitoring. The most extensively studied technique is the polarization nulling method, for example as disclosed in a paper by J. H. Lee, H. Y. Choi, S. K. Shin, and Y. C. Chung, "A review of the polarization-nulling technique for monitoring optical-signal-to-noise ratio in dynamic WDM networks," J. Lightwave Technol., vol. 24, no. 11, pp. 4162-4171 or Teralink Communications, Inc. (KR): Chung et al and U.S. Pat. No. 7,149,428, assigned to Teralink Communications, Inc. Both of these disclosures employ the polarization property difference between the ASE noise and the optical signal to identify the noise level in-band. Ideally, the optical signal is perfectly polarized and the noise is completely unpolarized. Under this situation a polarization controller (PC) can be used to turn the arbitrarily polarized optical signal into a linear polarization. Following the PC is a polarization beam splitter (PBS) which has one axis aligned with this linear polarization so the total optical signal power and half of the noise power will pass along this axis of the PBS and half of the noise power will go along another axis. Simply measuring the power in these two paths, the in-band OSNR value can be determined. Practically because the signal polarization changes rather fast, the PC should be fast enough to follow this change. Furthermore practically the optical signal is not perfectly polarized. Polarization mode dispersion (PMD) and nonlinear birefringence could reduce the degree of polarization of the optical signal. So the whole signal power will not pass through one axis of the PBS, some signal power will leak into the noise path and make the OSNR value measured inaccurate.

To solve this problem many methods have been proposed. One main method is to use a very narrow bandwidth optical filter to sample a spectral slice of the optical signal, for example as discloses in a paper by M.-H. Cheung, L.-K. Chen, and C.-K. Chan, "PMD-insensitive OSNR monitoring based on polarization-nulling with off-centre narrow-band filtering," IEEE Photon. Technol. Lett., vol. 16, no. 11, pp. 2562-2564, 2004. Because PMD is proportional to the signal bandwidth, this way can reduce the PMD influence.

Another method is to use two such narrow bandwidth filters to sample two spectral slices and let them beat with each other, as disclosed by U.S. Pat. No. 7,149,407 B1, Doerr et al. In this way, the first-order PMD influence can be removed. It will be appreciated; these additions make the polarization nulling method very complex and expensive. Also, for a narrow bandwidth optical signal like the widely deployed 10G NRZ-OOK signal, spectral slicing is very difficult. In addition, the noise could be polarized by the polarization dependent loss of the path. At the moment no methods can tackle this problem under the polarization nulling frame, M. D. Feuer, "Measurement of OSNR in the presence of partially polarized ASE," IEEE Photon. Technol. Lett., vol. 17, no. 2, pp. 435-437, 2005.

Another method is to use an optical interferometer with a fixed optical delay between the two arms of the interferometer, as disclosed in US 2007/0297043, Kao et al. If a fixed delay is used, the interferogram visibility of the optical signal through the interferometer at this delay has to be pre-determined as analyzed above, as disclosed in a paper by Z. Tao, Z. Chen, L. Fu, D. Wu, and A. Xu, "Monitoring of OSNR by using a Mach-Zehnder interferometer," Microwave and Optical Technol. Lett., vol. 30, no. 1, pp. 63-65, 2001. This can be achieved by, for example, turning off the noise source. In practice, this is not possible. Also, the interferogram visibility of the optical signal changes with additional filtering, self (cross)-phase modulation, the bias and the drive signal change of the modulator used to generate the signal, J. M. Oh, M. Brodsky, L. E. Nelson, G. Cadena, and M. D. Feuer, "Interferometric optical signal-to-noise ratio measurements of telecom signals with degraded extinction ratio," Opt. Lett., vol. 33, no. 18, pp. 2065-2067, 2008. Therefore this visibility must be renewed periodically which it technically difficult to achieve.

U.S. Pat. No. 7,499,173, Brodsky et al, discloses a scheme that just needs to measure one interferogram of the noise loaded signal to find the in-band optical-signal-to-noise-ratio (OSNR). To facilitate this, the amplitude autocorrelations of the signal and the band-limited noise have to be assumed to be known separately. Normally an interferometer with a relatively long optical delay is used to make the amplitude autocorrelation of the noise effectively zero. In U.S. Pat. No. 7,499,173 measuring more than one interferogram of the noise loaded signal has been suggested for identifying the modulation format only. It is assumed that the amplitude autocorrelation curve of the signal is known and is different for different formats. Therefore the OSNR is measured uses a long delay.

Therefore there is a need to provide in-band OSNR monitoring techniques. The technique proposed here is to address the in-band OSNR monitoring problem simply and robustly. The measurement will provide valuable data to the network operators which will be used to detect any problems with particular optical amplifiers and to maintain a low bit-error-rate necessary for efficient communication.

SUMMARY OF THE INVENTION

According to the present invention there is provided, as set out in the appended claims, a system and method for measuring optical signal-to-noise-ratio (SNR) in an optical communication system comprising:
  a channel filter adapted to select one specific optical communication channel from a wavelength-division-multiplexing (WDM) optical communication system, the channel comprises an optical signal carrying digital bit information and noise from optical power amplifiers;
  at least one optical delay interferometer adapted to measure at least two interferograms of the noisy signal; and
  means for calculating the in-band OSNR from extinctions of the interferograms measured at different optical delays, wherein said optical delays are selected to be substantially less than a bit period of the optical channel.

In one embodiment the at least one optical delay interferometer comprises means for varying the optical delay to measure at least two interferograms at different optical delays.

In one embodiment the optical delay interferometer comprises a fixed optical delay, and a second optical delay interferometer comprising a fixed optical delay or a variable optical delay.

The uniqueness of the invention is that the system measures at least two interferograms of the noisy signal with at least two optical delays which are much smaller (<=25%) than the bit period of the optical signal. It will be appreciated that in having the optical delay substantially less than bit period should be interpreted broadly and is less than at least 50% and preferably less than 23% for optimum operation.

In one embodiment the extinction of an interferogram is the maximum measured current or voltage value divided by the measured minimum current or voltage value over an interferogram period. It will be appreciated other values can be used. The extinctions of these measured interferograms can be used to derive the in-band OSNR by referring to each other. Because of the self-reference used here, the system can follow any changes happening to the signal such as additional filtering, self (cross)-phase modulation, the bias and drive signal change of the modulator used to generate the optical signal. This is the advantage of the system over a system using a single interferometer with a fixed delay. If measuring a single interferogram of the noisy signal with a single delay, the interferogram visibility of the pure signal should be pre-determined and should be kept unchanged ever since. This is difficult in practice.

In one embodiment the extinctions of the measured interferograms are adapted to derive the in-band OSNR by reference to each other.

In one embodiment the coherence difference between signal and noise is employed to derive the in-band OSNR. Because the system uses coherence difference between signal and noise to derive the in-band OSNR, it is not influenced by the depolarization of the signal or polarization problems of noise mentioned above. Methods completely or partly dependent on the polarization property difference between the signal and noise will suffer from these practically unavoidable influences.

In one embodiment the interferometer comprises a variable optical delay, which can be used to measure at least two interferograms of the noisy signal at at least two different optical delays.

In one embodiment the interferometer comprises an optical delay element and a variable phase element.

In one embodiment the interferometer comprises optical phase variation capability so that interferograms can be measured.

In one embodiment the delay elements are arranged in parallel.

In one embodiment the delay elements are arranged in series.

In one embodiment there is provided a controller is provided to control the delay period to in said delay elements.

In one embodiment the interferometer is a Mach-Zehnder (MZ) or Michelson type device.

In one embodiment a photodiode is connected to the output of the interferometer.

In another embodiment there is provided a system for measuring optical signal-to-noise-ratio (SNR) in an optical communication system comprising:
  a filter to select at least one optical communication channel, the channel communicating digital bit information in a signal;
  a first interferometer comprising a first delay element to measure at least one interferogram and adapted to provide a delay, said delay is selected to be less than a bit period of the channel;
  a second interferometer comprising a second delay element to measure at least one interferogram and adapted to provide a delay, said delay is selected to be less than a bit period of the channel; and
  means for calculating the extinction of each interferogram measurement for each delay, such that the optical SNR is derived from said measured interferogram, wherein said optical delays are selected to be substantially less than a bit period of the optical channel.

This invention presents one robust way to measure the in-band optical-signal-to-noise-ratio (OSNR) of a single optical communication channel. It makes use of multiple (at least two) optical interferometers with fixed optical delays or a single interferometer with variable delays to measure the noise level inside the band of an optical communication channel. These delays must be much smaller than (<=20%) the bit period of the channel. The scheme can be used to measure any channel in the wavelength-division-multiplexing (WDM) communication system by designating the channel filter to the desired channel.

In another embodiment there is provided a method for measuring optical signal-to-noise-ratio (SNR) in an optical communication system comprising the steps of:
  filtering one specific optical communication channel from a wavelength-division-multiplexing (WDM) optical communication system, the channel comprises an optical signal carrying digital bit information and noise from optical power amplifiers;

measuring at least two interferograms of the noisy signal using at least one optical delay interferometer; and calculating the in-band OSNR from extinctions of the interferograms measured at different optical delays, wherein said optical delays are selected to be substantially less than a bit period of the optical channel.

In a further embodiment of the present invention there is provided a method for measuring in-band optical signal-to-noise-ratio (SNR) in an optical communication system comprising:

determining the autocorrelation function of the in-band ASE noise at specific optical delays from the interferograms measured at these optical delays by turning off the optical signal or by sending a broadband ASE signal;

or determining the autocorrelation function of the in-band ASE noise at specific optical delays by Fourier transform of the measured in-band ASE noise spectrum;

assuming the signal autocorrelation function follows some simple functions such as the parabolic function, the Lorentzian function, etc, as the optical delay increases from zero to a value much smaller than the signal bit period, typically say <=20% of the bit period;

deriving the in-band OSNR value by self-referencing the extinctions of the interferograms measured for at least two optical delays specified above based on the assumed autocorrelation function of the optical signal introduced above.

According to a further embodiment, the invention provides a system and method for measuring optical signal-to-noise-ratio (SNR) in an optical communication system comprising:

a channel filter adapted to select one specific optical communication channel, the channel comprises an optical signal carrying digital bit information and noise;

at least one optical delay interferometer adapted to measure at least two interferograms of the noisy signal; and means for calculating the in-band OSNR from extinctions of the interferograms measured at different optical delays.

In a further embodiment there is provided a system and method for measuring optical signal-to-noise-ratio (SNR) in an optical communication system comprising:

a channel filter adapted to select one specific optical communication channel from a wavelength-division-multiplexing (WDM) optical communication system, the channel comprises an optical signal carrying digital bit information and noise from optical power amplifiers;

at least one optical delay interferometer adapted to measure at least two interferograms of the noisy signal; and means for calculating the in-band OSNR from extinctions of the interferograms measured at different optical delays.

There is also provided a computer program comprising program instructions for causing a computer program to carry out the above method which may be embodied on a record medium, carrier signal or read-only memory.

BRIEF DESCRIPTION OF THE DRAWINGS

The invention will be more clearly understood from the following description of an embodiment thereof, given by way of example only, with reference to the accompanying drawings, in which:—

DETAILED DESCRIPTION OF THE DRAWINGS

Figure 2:
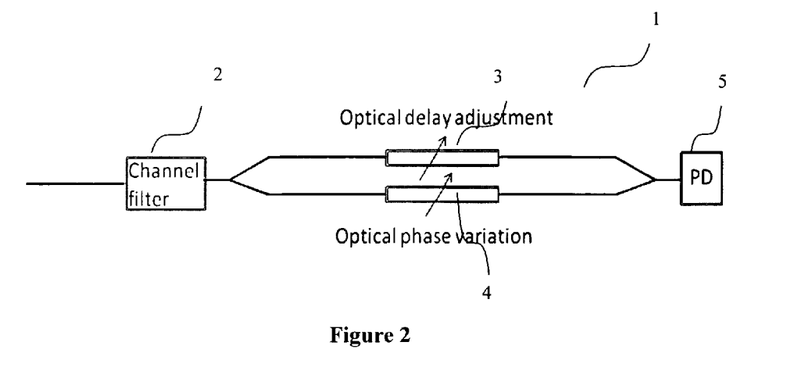
FIG. 2 illustrates a schematic diagram of one possible embodiment of the present invention with a Mach-Zehnder type interferometer.

FIG. 2 shows the schematic diagram of one embodiment that can be used to carry out the OSNR monitoring according to the invention, indicated generally by the reference numeral 1. A band pass filter acts as a channel filter 2 to select a specific optical communication channel. Two beam splitters 3, 4 are used to form a Mach-Zehnder (MZ) type interferometer. The interferometer typically can also be Michelson type. One arm 3 of the interferometer has a variable optical delay element which can adjust the optical delay between the two arms. On the other arm there is an optical phase variation element 4 which can adjust the optical phase difference between the two arms so as to measure the interferogram. After the interferometer there is a high sensitivity low speed photodiode (PD) 5.

The signal in the channel after the channel filter can be expressed as $e_{in}(t)=E(t)\exp(j2\pi f_0 t)$, where $f_0$ is the carrier frequency. After the interferometer the signal changes to:

$$e_{out}(t)=\sqrt{K_d}E(t+\tau_d)\exp(j2\pi f_0(t+\tau_d))+ \sqrt{K_p}E(t+\tau_p)\exp(j2\pi f_0(t+\tau_p)) \quad (1)$$

where $K_d$ represents the power of the signal passing through the interferometer arm with the variable optical delay and $K_p$ represents the power of the signal passing through the interferometer arm with the variable optical phase, $\tau_d$ is the delay which is ps level and is for the optical phase variation and so it is just around the optical cycle level (~5 fs). For noise it is possible to use similar expressions. The noise immediately after the channel filter can be expressed as $n_{in}(t)=N(t)\exp(j2\pi f_0 t)$. After the interferometer it can be expressed as:

$$n_{out}(t)=\sqrt{K_d}N(t+\tau_d)\exp(j2\pi f_0(t+\tau_d))+ \sqrt{K_p}N(t+\tau_p)\exp(j2\pi f_0(t+\tau_p)) \quad (2)$$

It is assumed the interferometer is polarization insensitive so a scalar description of the signal and noise is adopted. The low speed PD will detect an electric current as:

$$i=C\overline{|e_{out}(t)+n_{out}(t)|^2} \quad (3)$$

where C is a constant relating to the detector efficiency. For noise:

$$\overline{N(t)} = 0, \overline{N^*(t)N(t)} = P_n \quad (4)$$

$$\overline{N^*(t)N(t+\tau)} = \int F(f)\exp(j2\pi f\tau)df$$

$$\overline{N(t)N^*(t+\tau)} = \int F(-f)\exp(j2\pi f\tau)df$$

$$\int \frac{F(f)+F(-f)}{2}\exp(j2\pi f\tau)df \equiv \gamma_n(\tau)P_n$$

where $F(f)$ is the noise power spectrum which we assume can be accurately measured so that $\gamma_n(\tau)$, the autocorrelation of the noise amplitude, can be determined. As can be seen from equation (4), $\gamma_n(\tau)$ will be a real and even function of $\tau$ and will have a peak value of 1 at $\tau=0$.

For signal after the channel filter can similarly be defined as:

$$\overline{E^*(t)E(t)} = P_s \quad (5)$$

$$\overline{E^*(t)E(t+\tau)} = \int S(f)\exp(j2\pi f\tau)df$$

$$\overline{E(t)E^*(t+\tau)} = \int S(-f)\exp(j2\pi f\tau)df$$

$$\int \frac{S(f)+S(-f)}{2}\exp(j2\pi f\tau)df \equiv \gamma_s(\tau)P_s$$

where $S(f)$ is the signal power spectrum. As seen from (5), $\gamma_s(\tau)$, the autocorrelation of the signal amplitude will be a real and even function of $\tau$ as well and will always have a peak value of 1 at $\tau=0$.

With the above definition the current detected can be simplified as:

$$i=C[(K_d+K_p)(P_s+P_n)+2\sqrt{K_dK_p}\cos(2\pi f_0(\tau_d-\tau_p))(P_s\gamma_s(\tau_d-\tau_p)+P_n\gamma_n(\tau_d-\tau_p))] \quad (6)$$

Because $\tau_p \ll \tau_d$, the above equation can be further simplified as $$i=C[(K_d+K_p)(P_s+P_n)+2\sqrt{K_dK_p}\cos(2\pi f_0(\tau_d-\tau_p))(P_s\gamma_s(\tau_d)+P_n\gamma_n(\tau_d))] \quad (7)$$

For each $\tau_d$ as changing $\tau_p$, the current will follow a sine curve which is the interferogram of the noisy signal. The interferogram has the maximum and minimum values as $$i_{max}=C[(K_d+K_p)(P_s+P_n)+2\sqrt{K_dK_p}(P_s\gamma_s(\tau_d)+P_n\gamma_n(\tau_d))] \quad (8)$$

$$i_{min}=C[(K_d+K_p)(P_s+P_n)-2\sqrt{K_dK_p}(P_s\gamma_s(\tau_d)+P_n\gamma_n(\tau_d))] \quad (9)$$

The extinction of the interferogram is $\rho=i_{max}/i_{min}$ which is the main quantity needed for effective operation of the invention to measure. It will be appreciated that a voltage quantity may also be used. In practice the extinction is always expressed in the log scale because it is generally a large value. From the maximum and minimum values of the interferogram it is also possible to define the following quantities $$i_{ave} \equiv \frac{i_{max}+i_{min}}{2} = C(K_d+K_p)(P_s+P_n) \quad (10)$$

$$i_{diff} \equiv \frac{i_{max}-i_{min}}{2}2C\sqrt{K_dK_p}(P_s\gamma_s(\tau_d)+P_n\gamma_n(\tau_d)) \quad (11)$$

The visibility of the interferogram is defined as $\mu=i_{diff}/i_{ave}$. The visibility and extinction of an interferogram are related to each other simply through $\mu=(\rho-1)/(\rho+1)$ and $\rho=(1+\mu)/(1-\mu)$.

It can be observed that if the visibility is close to 1 for example 0.998, the extinction would be very high for example close to 1000 (30 dB). Therefore it is possible to define $r=P_n/P_s$ to provide:

$$\frac{\gamma_s(\tau_d)+r\gamma_n(\tau_d)}{1+r} = \frac{i_{diff}(K_d+K_p)}{i_{ave}2\sqrt{K_dK_p}} = \frac{\mu}{\left(\frac{2\sqrt{K_dK_p}}{(K_d+K_p)}\right)} \equiv M \quad (12)$$

where $M$ is the interferogram visibility of the noisy signal with the arm imbalance of the interferometer being calibrated. From (12) it can be found that $$r = \frac{\gamma_s(\tau_d)-M}{M-\gamma_n(\tau_d)} \quad (13)$$

As stated above $\gamma_n(\tau_d)$ is known, so if $\gamma_s(\tau_d)$ is known the signal to noise ratio can be found and the OSNR can therefore be derived using the following equation:

$$OSNR = 10\log_{10}\left(\frac{1}{r}\frac{NEB(nm)}{0.1(nm)}\right) \quad (14)$$

$$= -10\log_{10}(r) + 10\log_{10}\left(\frac{NEB(nm)}{0.1(nm)}\right)$$

where NEB is the noise equivalent bandwidth of the channel filter. For the already developed methods based on a single interferometer with a fixed optical delay, the delay between the two arms is always made large enough to ensure $\gamma_n(\tau_d)$ is approximately zero. $\gamma_s(\tau_d)$ is obtained by turning off the noise source, in which case just signal exists so $r=0$ and $\gamma_s(\tau_d)=M$ which can be measured directly. After the noise is added, the same $\gamma_s(\tau_d)$ is used to obtain the OSNR. This method has proved to be immune to various impairments such as depolarisation of the signal caused by polarization mode dispersion (PMD), partial polarization of the noise caused by polarization dependent loss (PDL) of optical elements installed in the transmission path of the optical channel, etc.

One problem is that practically it is difficult to turn off the noise so it is difficult to obtain $\gamma_s(\tau_d)$. Furthermore $\gamma_s(\tau_d)$ could change because the DC bias or the drive signal of the modulator used to generate the signal could change. Additional filtering and self(cross) phase modulation which change the signal spectrum could also change $\gamma_s(\tau_d)$. So the signal amplitude autocorrelation should be periodically monitored, which is difficult for a single interferometer with a fixed optical delay.

The invention employs optical delays much less than the bit period $1/v$, v is the speed of the signal. In this case it is possible to expand $\gamma_s(\tau_d)$ around $\tau_d=0$ as:

$$\gamma_s(\tau_d) = 1 - \sum_{k=1}^{K} c_k \tau_d^{2k}. \quad (15)$$

The invention proposes to have terms with powers of 2k in (15) because as pointed out above $\gamma_s(\tau_d)$ is an even function of $\tau_d$. Using this relation it is possible to change the equation (13) to:

$$\sum_{k=1}^{K} c_k \tau_{d,q}^{2k} + r(M_q - \gamma_n(\tau_{d,q})) = 1 - M_q \quad (16)$$

where the subscript q means we have made a series of measurements with different delays represented by $\tau_{d,q}$, q is from 1 to Q. So the equation (16) are a series of linear equations with unknown values of r and $c_k$ which can be solved if $Q \geq K+1$. Generally selecting k=1 and doing two measurements at two different delays, i.e. Q=2, can provide desirable results for operation.

Referring now to operation of the invention, in the following description it is generally assumed that the system and method measures two interferograms of the noisy signal at two different delays which are short compared with the bit period (<=25% of the bit period), with reference to FIGS. 3 and 4. To implement the proposed scheme it is necessary to measure interferograms of the noisy signal at two different delays. This can be done with a single interferometer with a variable but well controlled delay. It is possible to do the two measurements with two delays in series. Another choice is to make two interferometers with two fixed but different delays and measure two interferograms in parallel.

It is generally easier to make fixed delay interferometers. In a preferred embodiment, fixed delay interferometers will be used because they do not require specific delay values and are easy to make. Generally these interferometers can be made of MZ type or Michelson type. They can be built upon bulk optical elements using miniaturized free space setup or through fibre based elements or through optical planar integrated circuits based on silica or silicon waveguides.

To illustrate operation of the invention one practical OSNR monitoring experiment on a single 10G NRZ-OOK communication channel was implemented and is now described. Two free space Michelson-type interferometers formed by bulk optical elements have been used in the experiment.

Figure 3:
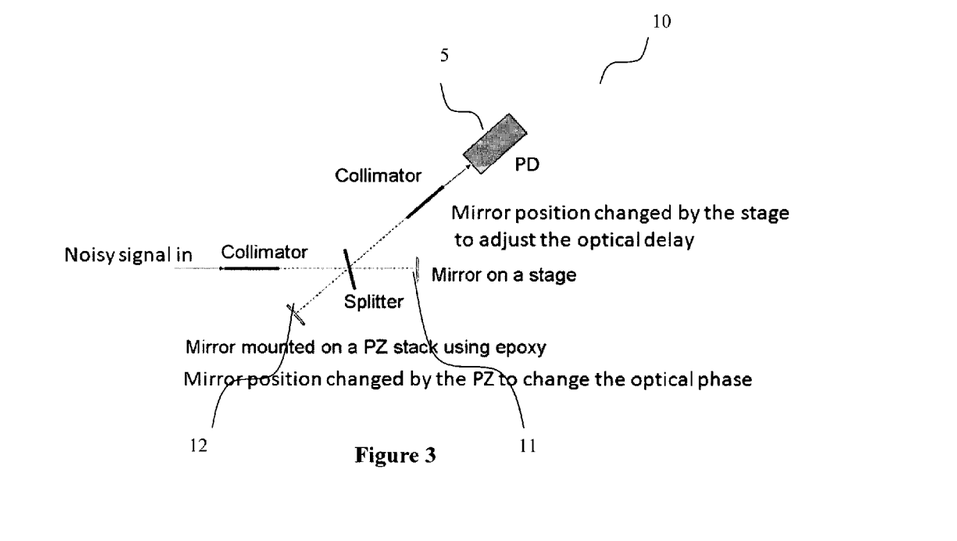
FIG. 3 illustrates a schematic diagram of the free space Michelson-type interferometer used.

FIG. 3 shows a schematic diagram of one such interferometer, indicated generally by the reference numeral 10. One mirror 11 of the interferometer is mounted on a stage which can be used to control the optical delay. A second mirror 12 is mounted on a Piezoelectric (PZ) stack which can be used to vary the optical phase. The two interferometers have optical delays at 8.5 ps and 13.3 ps, respectively, which are just arbitrarily selected to be less than 20% of the bit period that is 100 ps for the 10G NRZ-OOK signal. The PZ stack is modulated by a voltage triangle wave at a frequency around 20 Hz. The interferograms are recorded from InGaAs detectors following the interferometer through a DAQ card at 500 kHz.

Figure 4:
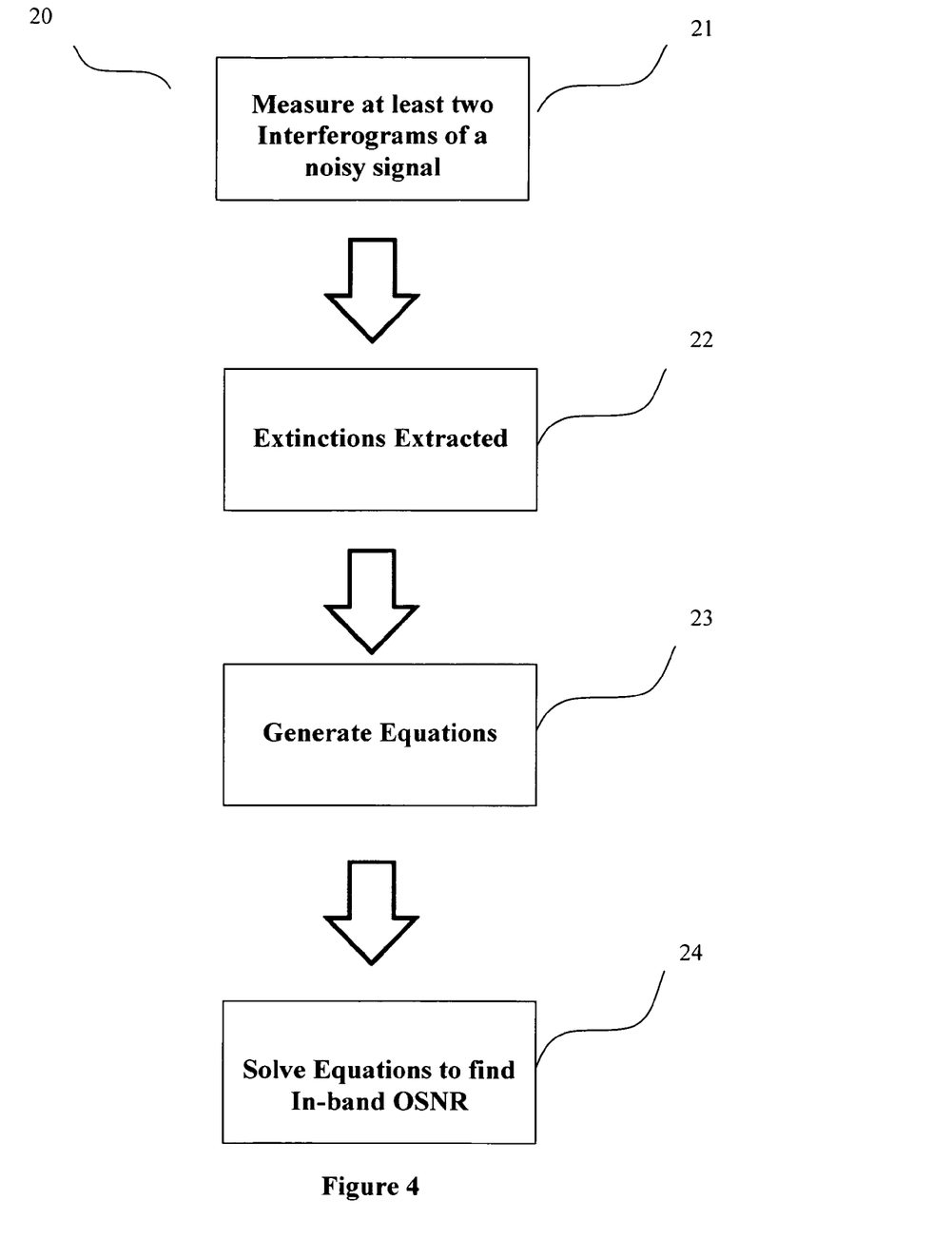
FIG. 4 is a flow chart illustrating operation of the invention.

FIG. 4 is a flowchart illustrating a sample flow of operation, indicated generally by the reference numeral 20. In step 21 at least two interferograms of the noisy signal are measured by using interferometers with different optical delays much shorter than the bit period of the signal. In step 22 extinctions are extracted from these interferograms. In step 23 equations are established, for example equation 16 above, with the in-band OSNR as an unknown value as well as some coefficients used in a model to describe the amplitude autocorrelation curve of the signal when the optical delays are much shorter than the bit period of the signal; the above extracted extinctions are known values as well as the amplitude autocorrelation of the band-limited noise. In step 24 the equation is then solved to find the in-band OSNR, using known computation techniques.

Figure 5:
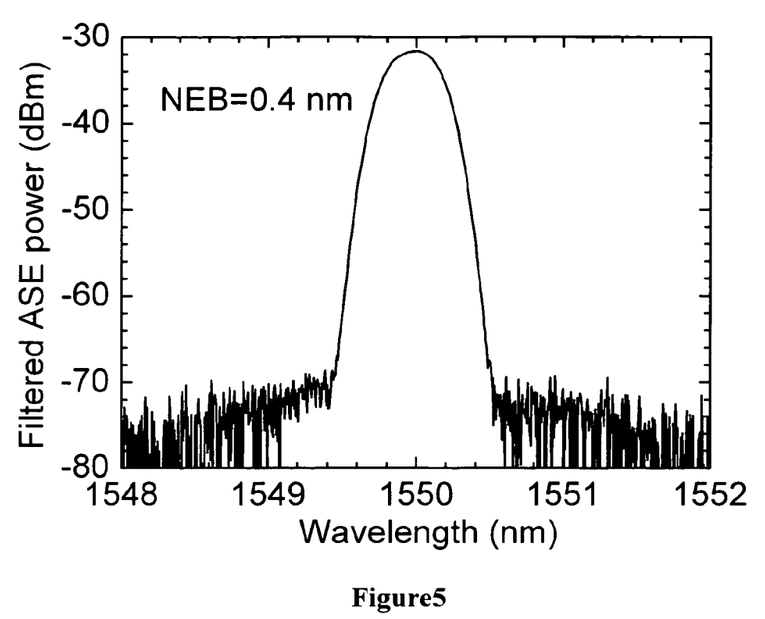
FIG. 5 illustrates a measured filter function of the channel filter according to one aspect of the invention.
Figure 6:
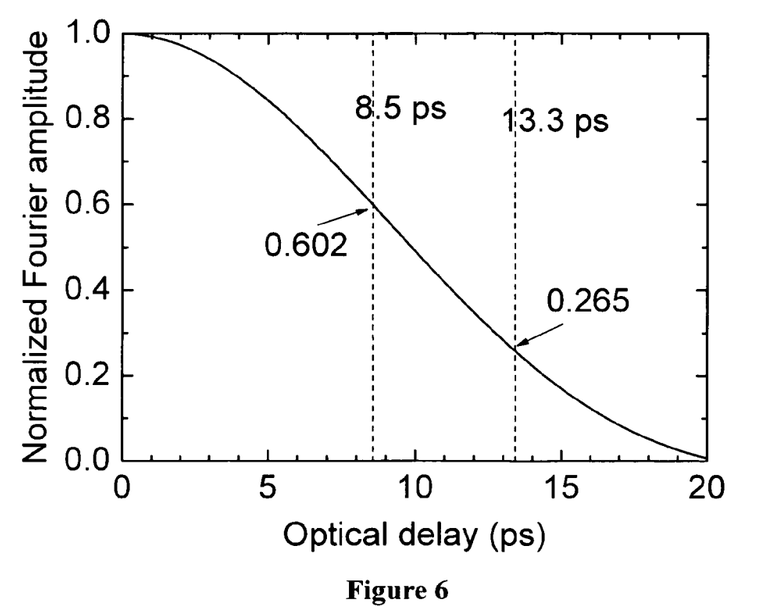
FIG. 6 illustrates an autocorrelation function of the noise amplitude according to one aspect of the invention.
Figure 7:
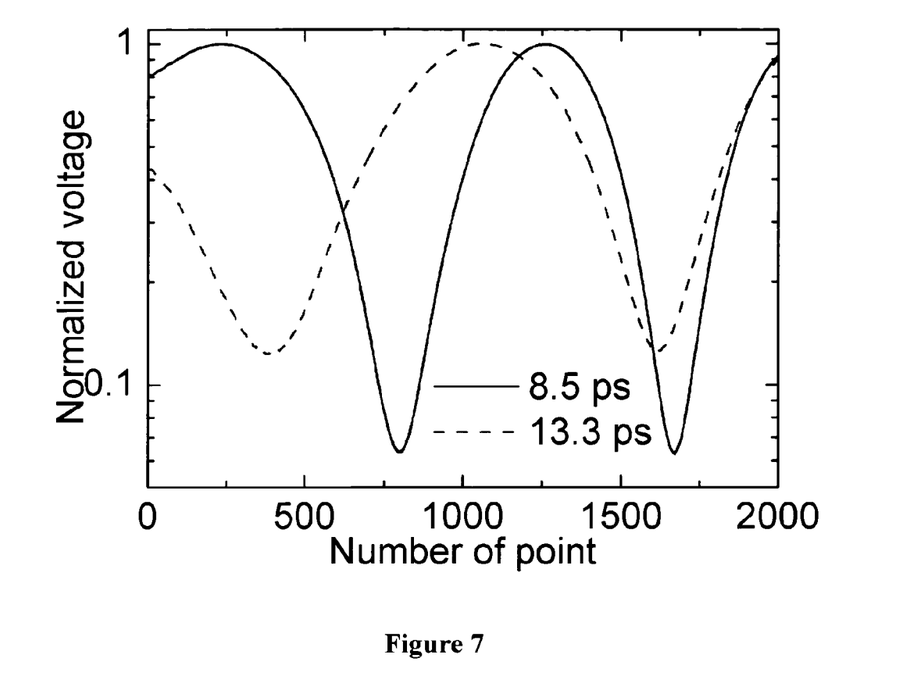
FIG. 7 illustrates typical measured interferograms from two interferometers with different optical delays.
Figure 8:
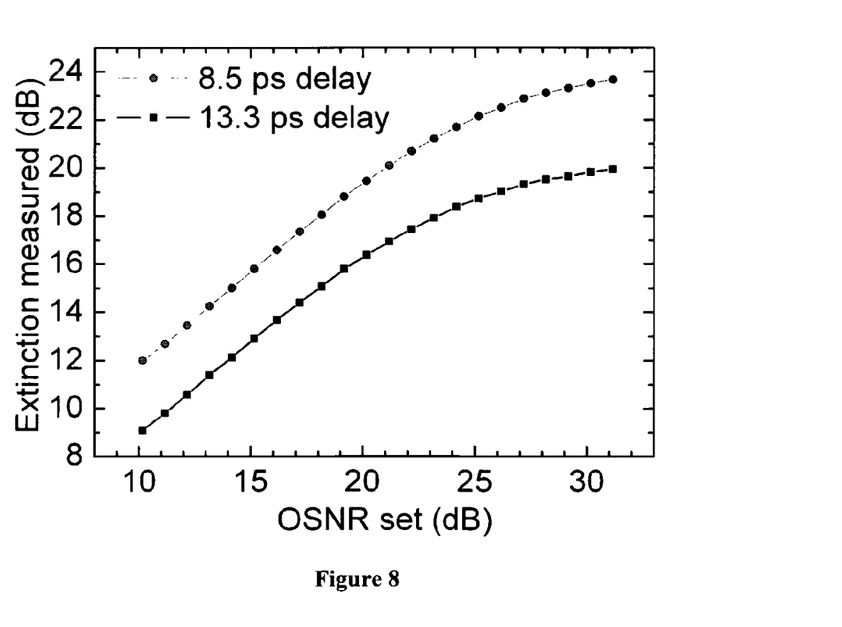
FIG. 8 illustrates typical interferogram extinctions varying with the OSNR value for two interferometers with different optical delays.
Figure 9:
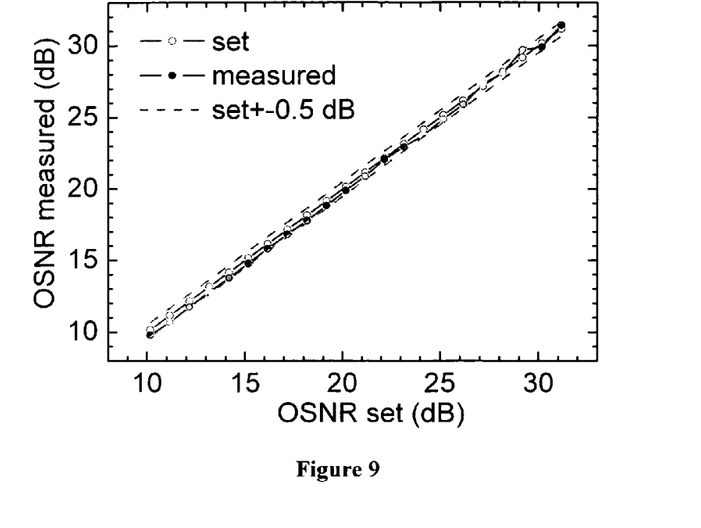
FIG. 9 illustrates OSNR values measured by the proposed scheme versus values directly set.

The channel filter used has a bandwidth of 0.4 nm as seen from the following FIG. 5. The autocorrelation function of the noise amplitude, $\gamma_n$, can be found by Fourier transforming the measured filter function as seen in FIG. 6. By attenuating the noise power but keeping the signal power constant it is possible to change the OSNR value of the signal noise combination. For an OSNR value of 10 dB, the two interferograms from the two interferometers recorded by the DAC card are shown in FIG. 7. From these interferograms the extinctions as well as the visibilities of the signal noise combination can be calculated. FIG. 8 shows the extinctions change with the varied OSNR. The OSNR values can then be calculated from these extinctions and visibilities. The obtained results are shown in FIG. 9. As seen from FIG. 9 the method according to the invention obtained good results. For OSNR from 10 dB to more than 30 dB, the error from the measurement is within ±0.5 dB.

Figure 10:
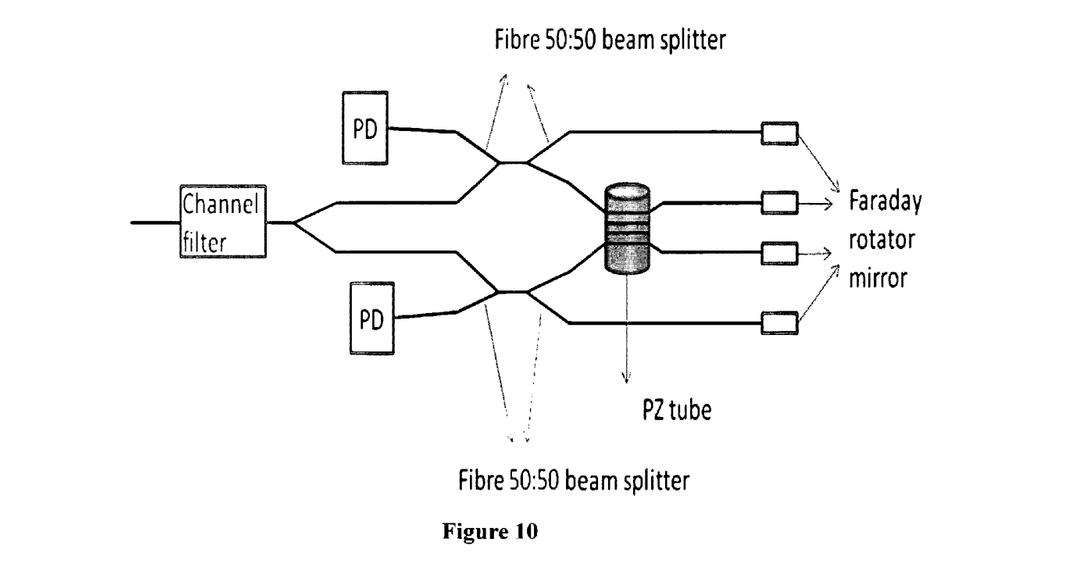
FIG. 10 illustrates one possible embodiment setup with all-fibre based elements.

Although the above experiments were carried out based on free space interferometers using bulk optical elements, a similar setup can also be realized by fibre based optical elements as shown in FIG. 10. A PZ tube is used to stretch the fibre so as to realize the optical phase variations for the two Michelson interferometers simultaneously. The Faraday rotator mirrors are used to cancel the uncertain polarization rotations caused by the fibre beam splitters. The optical delays are set by the fibre length difference between the two arms of the Michelson interferometers.

It will be appreciated that a key aspect of the invention is that the system measures at least two interferograms at at least two different optical delays and then use the above introduced procedures (mainly equation (16)) to calculate the OSNR. The benefits of using for example two delays simultaneously include: any signal changes caused by for example additional filtering, DC bias or drive signal change of the modulator used to generate the signal, self- or cross-phase modulation in the transmission path, will not influence the measurement. However using a single delay will not be immune to these influences. Furthermore the proposed scheme keeps the merits of schemes which use interferometers to measure the OSNR. It is immune to chromatic dispersion and polarization mode dispersion influence, immune to the influence from partial polarizations of noise, etc.

It will be appreciated that the invention provides a cheap and robust OSNR monitoring technique could be potentially very useful because no matter how the present optical communication system upgrades itself optical amplifiers would still be widely used so the ASE noise would remain as an issue. The OSNR is a good indicator of the noise level inside a communication channel in the optical layer.

As communication system becomes more and more complex (more amplifiers used) and flexible (different channels have different transmission history) the OSNR monitoring will become more useful because it can help to predict which amplifier or which channel could be in trouble so as to reduce the cost for managing the system.

It will be appreciated that the system of the present invention does not assume that the amplitude autocorrelation of the signal is known, and assumes that the autocorrelation curve of the signal follows a known trend if the optical delay is relatively short compared with the bit period of the signal, for example the autocorrelation of the signal drops from a value of 1 in a parabolic shape when the delay increases from zero to a value that is much shorter than the bit period. The system of the present invention has to measure more than one interferogram of the noise loaded signal to find the in-band OSNR. The in-band OSNRs are obtained by self-referencing the extinctions extracted from these interferograms based on the above assumed trend. These interferograms can be obtained by using multiple interferometers with fixed optical delays or using a single interferometer with variable optical delays. In the present invention because the optical delays are relatively short compared to the bit period of the signal the amplitude autocorrelation of the band-limited noise is not zero so the noise amplitude autocorrelation function must be determined to calculate the OSNR. This is the case if the band-limited noise spectrum is known.

The embodiments in the invention described with reference to the drawings comprise a computer apparatus and/or processes performed in a computer apparatus. However, the invention also extends to computer programs, particularly computer programs stored on or in a carrier adapted to bring the invention into practice. The program may be in the form of source code, object code, or a code intermediate source and object code, such as in partially compiled form or in any other form suitable for use in the implementation of the method according to the invention. The carrier may comprise a storage medium such as ROM, e.g. CD ROM, or magnetic recording medium, e.g. a floppy disk or hard disk. The carrier may be an electrical or optical signal which may be transmitted via an electrical or an optical cable or by radio or other means.

The invention is not limited to the embodiments hereinbefore described but may be varied in both construction and detail.

The invention claimed is:

1. A system for measuring optical signal-to-noise-ratio (OSNR) in an optical communication system comprising:
   a channel filter adapted to select one specific optical communication channel from a wavelength-division-multiplexing (WDM) optical communication system, the channel comprises an optical signal carrying digital bit information and noise from optical power amplifiers; characterised by:
      at least one optical delay interferometer adapted to measure at least two interferograms of the noisy signal; and
      means for calculating the in-band OSNR from extinctions of the interferograms measured at different optical delays, wherein said optical delays are selected to be substantially less than a bit period of the optical communication channel.

2. The system of claim 1 wherein the at least one optical delay interferometer comprises means for varying the optical delay to measure at least two interferograms at different optical delays.

3. The system of claim 1 wherein the optical delay interferometer comprises a fixed optical delay, and a second optical delay interferometer comprising a fixed optical delay or a variable optical delay.

4. The system of claim 1 wherein said delay is selected to be less than or equal to 25% of the bit period of the optical channel.

5. The system of claim 1 wherein the extinction of an interferogram is the maximum measured current or voltage divided by the measured minimum current or voltage value over an interferogram period.

6. The system of claim 1 wherein the extinctions of the measured interferograms are adapted to derive the in-band OSNR by reference to each other.

7. The system of claim 1, wherein the extinctions of the measured interferograms are adapted to derive the in-band OSNR by reference to each other and comprising means to employ coherence difference between the optical signal and noise to derive the in-band OSNR.

8. The system of claim 1 wherein the delay is selected to be much less than the bit period $1/v$, where $v$ is the bit frequency of the signal and less than 20% of the bit period.

9. The system of claim 1 wherein the interferometer comprises an optical delay element and an optical phase variation element.

10. The system of claim 1 wherein at least two interferograms of the noise signal are measured in parallel through multiple interferometers with fixed optical delays or in series through an interferometer with variable optical delays.

11. The system of claim 1 wherein the interferograms are measured by varying the optical phase on one arm or two arms of the interferometers through some controller signal such as voltage or current.

12. The system of claim 1 wherein the interferometer is a Mach-Zehnder (MZ) or Michelson type device.

13. The system of claim 1 wherein a photodiode is connected to the output of the interferometer.

14. A system for measuring optical signal-to-noise-ratio (SNR) in an optical communication system comprising: a filter to select at least one optical communication channel, the channel communicating digital bit information in a signal;
   a first interferometer comprising a first delay element to measure at least one interferogram and adapted to provide a first optical delay, said delay is selected to be less than a bit period of the channel;
   a second interferometer comprising a second delay element to measure at least one interferogram and adapted to provide a second optical delay, said delay is selected to be less than a bit period of the channel; and
   means for calculating the extinction of each interferogram measurement for each delay, such that the optical SNR is derived from each said measured interferogram, wherein said optical delays are selected to be substantially less than a bit period of the optical channel; wherein the first optical delay is different than the second optical delay.

15. A method for measuring optical signal-to-noise-ratio (SNR) in an optical communication system comprising the steps of:
   filtering one specific optical communication channel from a wavelength-division-multiplexing (WDM) optical communication system, the channel comprises an optical signal carrying digital bit information and noise from optical power amplifiers;
   measuring at least two interferograms of the noisy signal using at least one optical delay interferometer; and
   calculating the in-band OSNR from extinctions of the interferograms measured at different optical delays, wherein said optical delays are selected to be substantially less than a bit period of the optical channel.

* * * * *